(12) United States Patent
Archer et al.

(10) Patent No.: US 7,646,721 B2
(45) Date of Patent: Jan. 12, 2010

(54) LOCATING HARDWARE FAULTS IN A DATA COMMUNICATIONS NETWORK OF A PARALLEL COMPUTER

(75) Inventors: Charles J. Archer, Rochester, MN (US); Mark G. Megerian, Rochester, MN (US); Joseph D. Ratterman, Rochester, MN (US); Brian E. Smith, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 576 days.

(21) Appl. No.: 11/279,586

(22) Filed: Apr. 13, 2006

(65) Prior Publication Data

US 2007/0242609 A1 Oct. 18, 2007

(51) Int. Cl.
*H04L 12/26* (2006.01)
(52) U.S. Cl. .......................... 370/242; 714/25
(58) Field of Classification Search ......... 370/241–246, 370/248, 252; 712/11, 10, 1; 709/252; 714/1, 714/25
See application file for complete search history.

(56) References Cited

U.S. PATENT DOCUMENTS

| 7,200,118 | B2 * | 4/2007 | Bender et al. ............... 370/242 |
| 2007/0174558 | A1 * | 7/2007 | Jia et al. ..................... 711/147 |
| 2008/0270998 | A1 * | 10/2008 | Zambrana ................... 717/131 |

* cited by examiner

*Primary Examiner*—Ricky Ngo
*Assistant Examiner*—Pao Sinkantarakorn
(74) *Attorney, Agent, or Firm*—Biggers & Ohanian, LLP

(57) ABSTRACT

Hardware faults location in a data communications network of a parallel computer. Such a parallel computer includes a plurality of compute nodes and a data communications network that couples the compute nodes for data communications and organizes the compute node as a tree. Locating hardware faults includes identifying a next compute node as a parent node and a root of a parent test tree, identifying for each child compute node of the parent node a child test tree having the child compute node as root, running a same test suite on the parent test tree and each child test tree, and identifying the parent compute node as having a defective link connected from the parent compute node to a child compute node if the test suite fails on the parent test tree and succeeds on all the child test trees.

18 Claims, 8 Drawing Sheets

LOCATING HARDWARE FAULTS IN A DATA COMMUNICATIONS NETWORK OF A PARALLEL COMPUTER

GOVERNMENT RIGHTS IN INVENTION

The U.S. Government has a paid-up license in this invention and the right to limited circumstances to require the patent owner to license others on reasonable terms as provided for by the terms of Contract No. B519700 awarded by the Department of Energy.

BACKGROUND OF THE INVENTION

1. Field of the Invention

The field of the invention is data processing, or, more specifically, methods, apparatus, and products for locating hardware faults in a data communications network of a parallel computer.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Parallel computing is an area of computer technology that has experienced advances. Parallel computing is the simultaneous execution of the same task (split up and specially adapted) on multiple processors in order to obtain results faster. Parallel computing is based on the fact that the process of solving a problem usually can be divided into smaller tasks, which may be carried out simultaneously with some coordination.

Parallel computers execute parallel algorithms. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple processing devices that execute the individual pieces of a parallel program are referred to as 'compute nodes.' A parallel computer is composed of compute nodes and other processing nodes as well, including, for example, input/output ('I/O') nodes, and service nodes.

Parallel algorithms are valuable because it is faster to perform some kinds of large computing tasks via a parallel algorithm than it is via a serial (non-parallel) algorithm, because of the way modern processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost.

Parallel algorithms are designed also to optimize one more resource the data communications requirements among the nodes of a parallel computer. There are two ways parallel processors communicate, shared memory or message passing. Shared memory processing needs additional locking for the data and imposes the overhead of additional processor and bus cycles and also serializes some portion of the algorithm.

Message passing processing uses high-speed data communications networks and message buffers, but this communication adds transfer overhead on the data communications networks as well as additional memory need for message buffers and latency in the data communications among nodes. Designs of parallel computers use specially designed data communications links so that the communication overhead will be small but it is the parallel algorithm that decides the volume of the traffic.

Many data communications network architectures are used for message passing among nodes in parallel computers. Compute nodes may be organized in a network as a 'torus' or 'mesh,' for example. Also, compute nodes may be organized in a network as a tree. A torus network connects the nodes in a three-dimensional mesh with wrap around links. Every node is connected to its six neighbors through this torus network, and each node is addressed by its x,y,z coordinate in the mesh. In a tree network, the nodes typically are connected into a binary tree: each node has a parent, and two children (although some nodes may only have zero or one children, depending on the hardware configuration). In computers that use a torus and a tree network, the two networks typically are implemented independently of one another, with separate routing circuits, separate physical links, and separate message buffers.

A torus network lends itself to point to point geometrically aware diagnostics, but a tree network typically is inefficient in point to point communication. A tree network, however, does provide high bandwidth and low latency for certain collective operations, message passing operations where all compute nodes participate simultaneously. Because thousands of nodes may participate in collective operations on a parallel computer, locating hardware faults in a data communications network of a parallel computer is difficult.

SUMMARY OF THE INVENTION

Methods, apparatus, and computer program products are disclosed for locating hardware faults in a data communications network of a parallel computer. Such a parallel computer includes a plurality of compute nodes and a data communications network that couples the compute nodes for data communications and organizes the compute node as a tree. Locating hardware faults includes identifying a next compute node as a parent node and a root of a parent test tree, identifying for each child compute node of the parent node a child test tree having the child compute node as root, running a same test suite on the parent test tree and each child test tree, and identifying the parent compute node as having a defective link connected from the parent compute node to a child compute node if the test suite fails on the parent test tree and succeeds on all the child test trees.

The foregoing and other objects, features and advantages of the invention will be apparent from the following more particular descriptions of exemplary embodiments of the invention as illustrated in the accompanying drawings

DETAILED DESCRIPTION OF EXEMPLARY EMBODIMENTS

Figure 1:
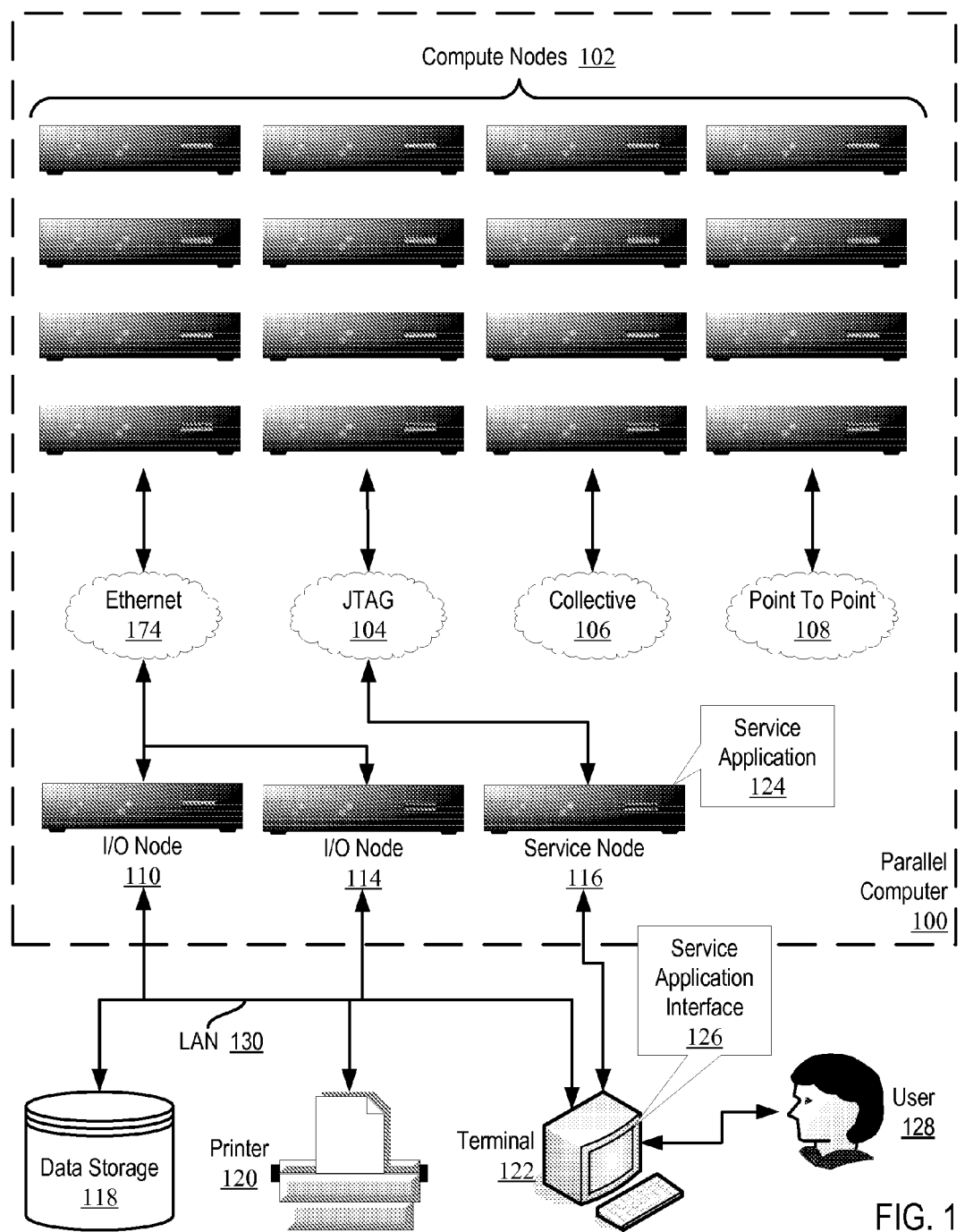
FIG. 1 illustrates an exemplary system for computer locating hardware faults in a data communications network of a parallel computer according to embodiments of the present invention.

Exemplary methods, apparatus, and computer program products for locating hardware faults in a data communications network of a parallel computer according to embodiments of the present invention are described with reference to the accompanying drawings, beginning with FIG. 1. FIG. 1 illustrates an exemplary system for locating hardware faults in a data communications network of a parallel computer according to embodiments of the present invention. The system of FIG. 1 includes a parallel computer (100), non-volatile memory for the computer in the form of data storage device (118), an output device for the computer in the form of printer (120), and an input/output device for the computer in the form of computer terminal (122). Parallel computer (100) in the example of FIG. 1 includes a plurality of compute nodes (102).

The compute nodes (102) are coupled for data communications by several independent data communications networks including a high speed Ethernet network (174), a Joint Test Action Group ('JTAG') network (104), a collective operations network (106), and a point to point operations network (108). Collective operations network (106) is a data communications network couples the compute nodes for data communications and organizes the compute nodes as a tree. Each data communications network is implemented with data communications links among the compute nodes (102). As described in more detail below in this specification, the system of FIG. 1 operates generally to locate hardware faults according to embodiments of the present invention by identifying a next compute node as a parent node and a root of a parent test tree, identifying for each child compute node of the parent node a child test tree having the child compute node as root, running a same test suite on the parent test tree and each child test tree, and identifying the parent compute node as having a defective link connected from the parent compute node to a child compute node if the test suite fails on the parent test tree and succeeds on all the child test trees.

In addition to compute nodes, computer (100) includes input/output ('I/O') nodes (110, 114) coupled to compute nodes (102) through one of the data communications networks (174). The I/O nodes (110, 114) provide I/O services between compute nodes (102) and I/O devices (118, 120, 122). I/O nodes (110, 114) are connected for data communications I/O devices (118, 120, 122) through local area network ('LAN') (130). Computer (100) also includes a service node (116) coupled to the compute nodes through one of the networks (104). Service node (116) provides service common to pluralities of compute nodes, loading programs into the compute nodes, starting program execution on the compute nodes, retrieving results of program operations on the computer nodes, and so on. Service node (116) runs a service application (124) and communicates with users (128) through a service application interface (126) that runs on computer terminal (122).

Routing communications around a defective link may be part of a point to point operation or a collective operation, and the second network through which communications data is routed around a defective link may or may not be optimized for the operation in effect when the routing around occurs. If routing around a defective link occurs as part of a point to point operation in a network optimized for point to point operations, such as, for example, a torus, then the second network through which a data packet is routed around a defective link may be a network that is optimized for collective operations rather than point to point operations, such as, for example, a collective tree network. If routing around a defective link occurs as part of a collective operation in a network optimized for collective operations, such as, for example, a tree network, then the second network through which a data packet is routed around a defective link may be a network that is optimized for point to point rather than collective operations, such as, for example, a torus network.

A collective operation is an operation, a message-passing computer program instruction that is executed simultaneously, that is, at approximately the same time, by all the compute nodes in a 'plurality' or 'group' of compute nodes. Such a plurality or group of compute nodes may include all the compute nodes in the parallel computer (100) or a subset all the compute nodes. In MPI terminology, such a 'plurality' or 'group' may be defined as a 'communicator.'

'MPI' refers to 'Message Passing Interface,' a prior art parallel communications library, a module of computer program instructions for data communications on parallel computers. Examples of prior-art parallel communications libraries that may be improved for locating hardware faults according to embodiments of the present invention include MPI and the 'Parallel Virtual Machine' ('PVM') library. PVM was developed by the University of Tennessee, The Oak Ridge National Laboratory and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer.

This specification sometimes uses MPI terminology for ease of explanation, although the use of MPI as such is not a requirement or limitation of the present invention.

Collective operations are composed of many point-to-point messages executed more or less concurrently (depending on the operation and the internal algorithm) and involve all processes running in a given group of compute nodes, that is, in a given MPI communicator. Every process on every compute node in the group must call or execute the same collective operation at approximately the same time. The required simultaneity is described as approximate because many processes running on many separate, physical compute node cannot be said to do anything all together at exactly the same time. Parallel communications libraries provide functions to support synchronization. In the MPI example, such a synchronization function is a 'barrier' routine. To synchronize, all processes on all compute nodes in a group call MPI_barrier( ), for example, and then all processes wait until all processes reach the same point in execution. Then execution continues, with substantial synchronization.

Most collective operations are variations or combinations of four basic operations: broadcast, gather, scatter, and reduce. In a broadcast operation, all processes specify the same root process, whose buffer contents will be sent. Processes other than the root specify receive buffers. After the operation, all buffers contain the message from the root process.

A scatter operation, like the broadcast operation, is also a one-to-many collective operation. All processes specify the same receive count. The send arguments are only significant to the root process, whose buffer actually contains sendcount * N elements of a given datatype, where N is the number of processes in the given group of compute nodes. The send buffer will be divided equally and dispersed to all processes (including itself). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduce operation is also a many-to-one collective operation that includes an arithmetic or logical function performed on two data elements. All processes specify the same 'count' and the same arithmetic or logical function. After the reduction, all processes have sent count data elements from their send buffers on compute nodes to the root process on the root node. In a reduction operation, data elements from corresponding send buffer locations are combined pair-wise by arithmetic or logical operations to yield a single corresponding element in the root process's receive buffer. Application specific reduction operations can be defined at runtime. Parallel communications libraries may support predefined operations. MPI, for example, provides the following pre-defined reduction operations:

| MPI_MAX | maximum |
|---|---|
| MPI_MIN | minimum |
| MPI_SUM | sum |
| MPI_PROD | product |
| MPI_LAND | logical and |

-continued

| MPI_BAND | bitwise and |
|---|---|
| MPI_LOR | logical or |
| MPI_BOR | bitwise or |
| MPI_LXOR | logical exclusive or |
| MPI_BXOR | bitwise exclusive or |

The arrangement of nodes, networks, and I/O devices making up the exemplary system illustrated in FIG. 1 are for explanation only, not for limitation of the present invention. Data processing systems capable of locating hardware faults according to embodiments of the present invention may include additional nodes, networks, devices, and architectures, not shown in FIG. 1, as will occur to those of skill in the art. The parallel computer (100) in the example of FIG. 1 includes sixteen compute nodes (102); parallel computers capable of locating hardware faults according to embodiments of the present invention sometimes include thousands of compute nodes. In addition to Ethernet and JTAG, networks in such data processing systems may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Locating hardware faults according to embodiments of the present invention is generally implemented on a parallel computer that includes a plurality of compute nodes. In fact, such computers may include thousands of such compute nodes. Each compute node is in turn itself a kind of computer composed of one or more computer processors, its own computer memory, and its own input/output adapters. For further explanation, therefore, FIG. 2 sets forth a block diagram of an exemplary compute node useful in a parallel computer capable of locating hardware faults in a data communications network according to embodiments of the present invention. The compute node (152) of FIG. 2 includes at least one computer processor (164) as well as random access memory ('RAM') (156). Processor (164) is connected to RAM (156) through a high-speed memory bus (154) and through a bus adapter (194) and a extension bus (168) to other components of the compute node.

Stored in RAM (156) is an application program (158), a module of computer program instructions, including instructions for collective operations, that carries out parallel, user-level data processing using parallel algorithms. Application program (158) contains computer program instructions that operate, along with other programs on other compute nodes in a parallel computer, to locate hardware faults according to embodiments of the present invention by identifying a next compute node as a parent node and a root of a parent test tree, identifying for each child compute node of the parent node a child test tree having the child compute node as root, running a same test suite on the parent test tree and each child test tree, and identifying the parent compute node as having a defective link connected from the parent compute node to a child compute node if the test suite fails on the parent test tree and succeeds on all the child test trees.

Also stored RAM (156) is a parallel communications library (160), a library of computer program instructions that carry out parallel communications among compute nodes, including point to point operations as well as collective operations. Application program (158) executes collective operations by calling software routines in parallel communications library (160). A library of parallel communications routines may be developed from scratch for use in locating hardware faults according to embodiments of the present invention, using a traditional programming language such as the C programming language, and using traditional programming methods to write parallel communications routines that send and receive data among nodes on two independent data communications networks. Alternatively, existing prior art libraries may be used. Examples of prior-art parallel communications libraries that may be improved for locating hardware faults according to embodiments of the present invention include the 'Message Passing Interface' ('MPI') library and the 'Parallel Virtual Machine' ('PVM') library. However it is developed, the parallel communications routines of parallel communication library (160) are improved to locate hardware faults according to embodiments of the present invention by identifying a next compute node as a parent node and a root of a parent test tree, identifying for each child compute node of the parent node a child test tree having the child compute node as root, running a same test suite on the parent test tree and each child test tree, and identifying the parent compute node as having a defective link connected from the parent compute node to a child compute node if the test suite fails on the parent test tree and succeeds on all the child test trees.

Also stored in RAM (168) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex that those of an operating system on a serial computer with many threads running simultaneously. In addition, there is no video I/O on the compute node (152) of FIG. 2, another factor that decreases the demands on the operating system. The operating system may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Microsoft XP™, AIX™, IBM's i5/OS™, and others as will occur to those of skill in the art.

Figure 2:
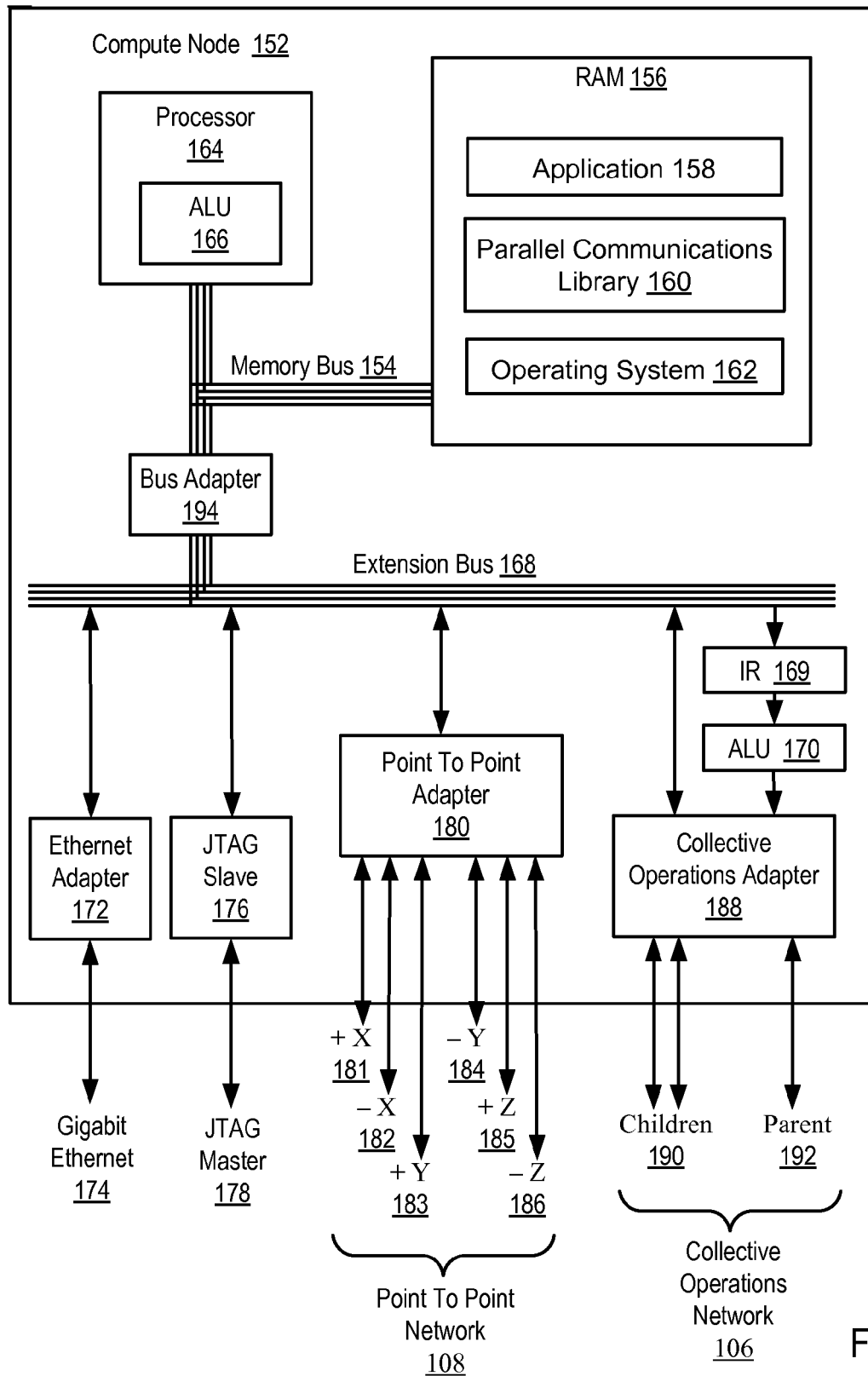
FIG. 2 sets forth a block diagram of an exemplary compute node useful in locating hardware faults in a data communications network of a parallel computer according to embodiments of the present invention.

The exemplary compute node (152) of FIG. 2 includes several communications adapters (172, 176, 180, 188) for implementing data communications with other nodes of a parallel computer. Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful in systems that locate hardware faults according to embodiments of the present invention include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (152) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 includes a JTAG Slave circuit (176) that couples example compute node (152) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient "back door" into the system.

The example compute node of FIG. 2 may be all three of these: It typically includes one or more integrated circuits installed on a printed circuit board and may be implemented as an embedded system having its own processor, its own memory, and its own I/O capability. JTAG boundary scans through JTAG Slave (176) may efficiently configure processor registers and memory in compute node (152) for use in locating hardware faults according to embodiments of the present invention.

The data communications adapters in the example of FIG. 2 includes a Point To Point Adapter (180) that couples example compute node (152) for data communications to a network (108) that is optimal for point to point message passing operations such as, for example, a network configured as a three-dimensional torus or mesh. Point To Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 includes a Collective Operations Adapter (188) that couples example compute node (152) for data communications to a network (106) that is optimal for collective message passing operations such as, for example, a network configured as a binary tree. Collective Operations Adapter (188) provides data communications through three bidirectional links: two to children nodes (190) and one to a parent node (192).

Example compute node (152) includes two arithmetic logic units ('ALUs'). ALU (166) is a component of processor (164), and a separate ALU (170) is dedicated to the exclusive use of collective operations adapter (188) for use in performing the arithmetic and logical functions of reduction operations. Computer program instructions of a reduction routine in parallel communications library (160) may latch an instruction for an arithmetic or logical function into instruction register (169). When the arithmetic or logical function of a reduction operation is a 'sum' or a 'logical or,' for example, collective operations adapter (188) may execute the arithmetic or logical operation by use of ALU (166) in processor (164) or, typically much faster, by use dedicated ALU (170).

Figure 3A:
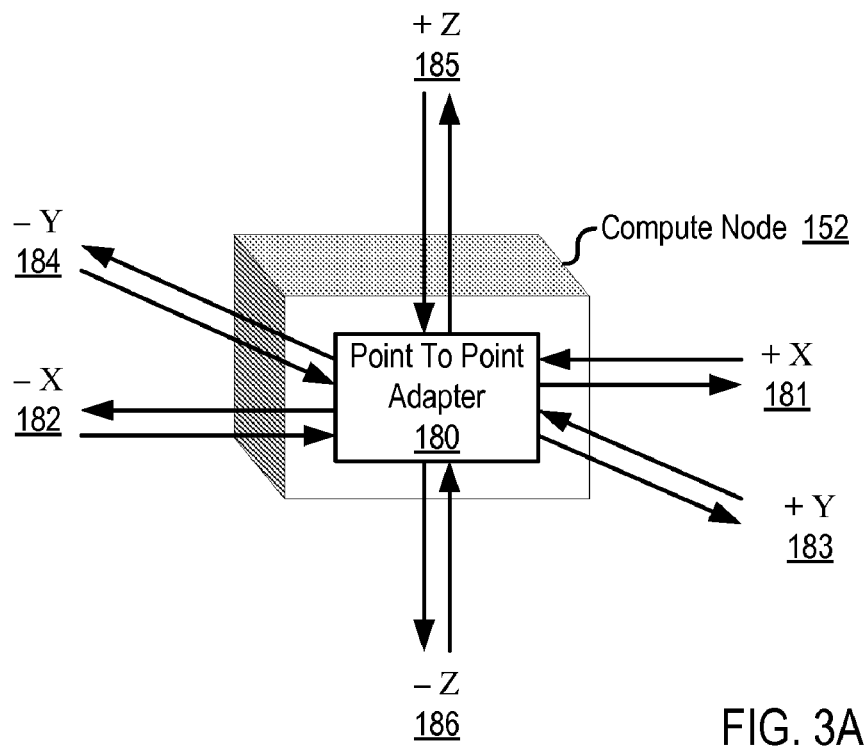
FIG. 3A illustrates an exemplary Point To Point Adapter useful in systems that locate hardware faults in a data communications network of a parallel computer according to embodiments of the present invention.

For further explanation, FIG. 3A illustrates an exemplary Point To Point Adapter (180) useful in systems that locate hardware faults according to embodiments of the present invention. Point To Point Adapter (180) is designed for use in a data communications network optimized for point to point operations, a network that organizes compute nodes in a three-dimensional torus or mesh. Point To Point Adapter (180) in the example of FIG. 3A provides data communication along an x-axis through four unidirectional data communications links, to and from the next node in the −x direction (182) and to and from the next node in the +x direction (181). Point To Point Adapter (180) also provides data communication along a y-axis through four unidirectional data communications links, to and from the next node in the −y direction (184) and to and from the next node in the +y direction (183). Point To Point Adapter (180) also provides data communication along a z-axis through four unidirectional data communications links, to and from the next node in the −z direction (186) and to and from the next node in the +z direction (185).

Figure 3B:
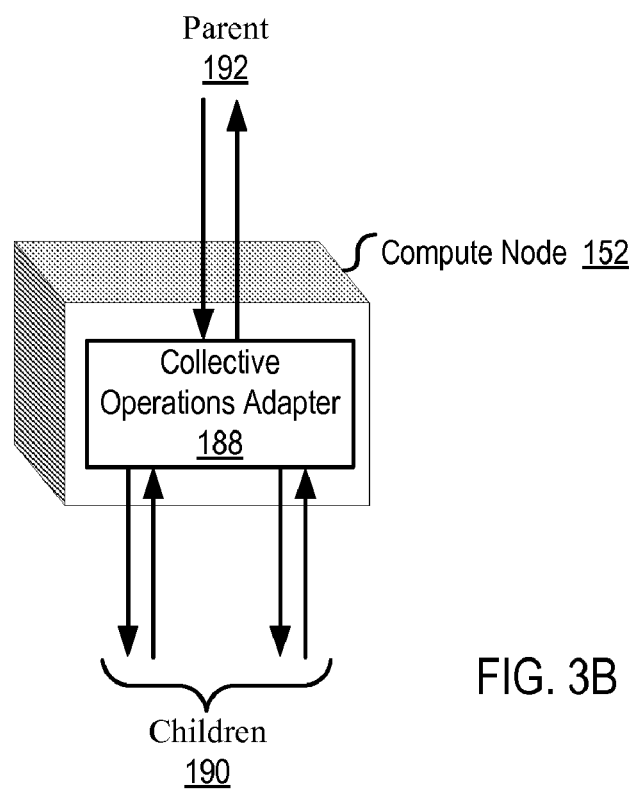
FIG. 3B illustrates an exemplary Collective Operations Adapter useful in systems that locate hardware faults in a data communications network of a parallel computer according to embodiments of the present invention.

For further explanation, FIG. 3B illustrates an exemplary Collective Operations Adapter (188) useful in systems that locate hardware faults according to embodiments of the present invention. Collective Operations Adapter (188) is designed for use in a network optimized for collective operations, a network that organizes compute nodes of a parallel computer in a binary tree. Collective Operations Adapter (188) in the example of FIG. 3B provides data communication to and from two child nodes through four unidirectional data communications links (190). Collective Operations Adapter (188) also provides data communication to and from a parent node through two unidirectional data communications links (192).

Figure 4:
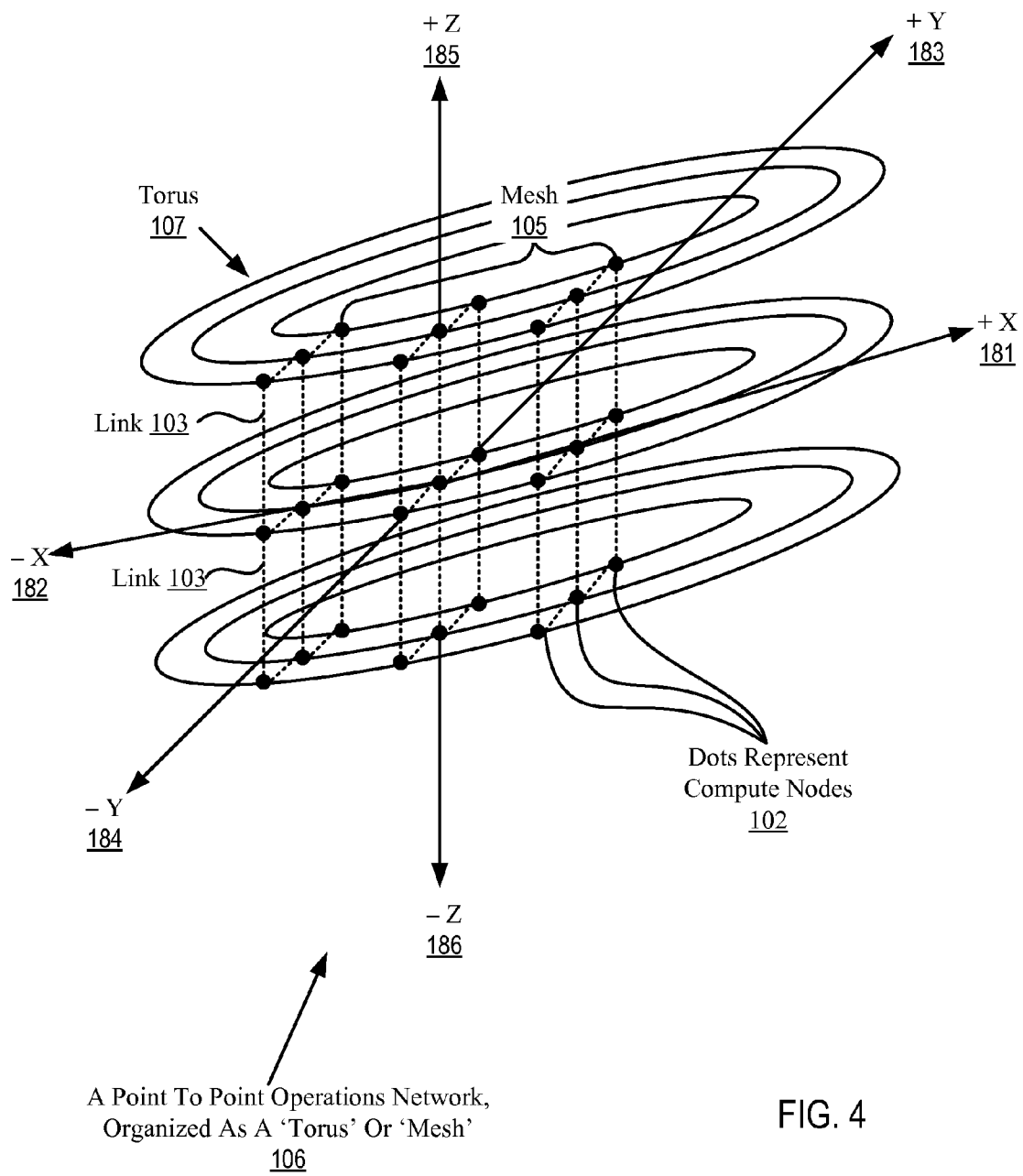
FIG. 4 illustrates an exemplary data communications network optimized for point to point operations.

For further explanation, FIG. 4 illustrates an exemplary data communications network optimized for point to point operations (106). In the example of FIG. 4, dots represent compute nodes (102) of a parallel computer, and the dotted lines between the dots represent data communications links between compute nodes. The data communications links are implemented with point to point data communications adapters similar to the one illustrated for example in FIG. 3A, with data communications links on three axes, x, y, and z, in six directions +x (181), −x (182), +y (183), −y (184), +z (185), and −z (186). The links and compute nodes are organized by this data communications network optimized for point to point operations into a three dimensional mesh (105) that wraps around to form a torus (107). Each compute node in the torus has a location in the torus that is uniquely specified by a set of x, y, z coordinates. For clarity of explanation, the data communications network of FIG. 4 is illustrated with only 27 compute nodes, but readers will recognize that a data communications network optimized for point to point operations for use in locating hardware faults in accordance with embodiments of the present invention may contain only a few compute nodes or may contain thousands of compute nodes.

Figure 5:
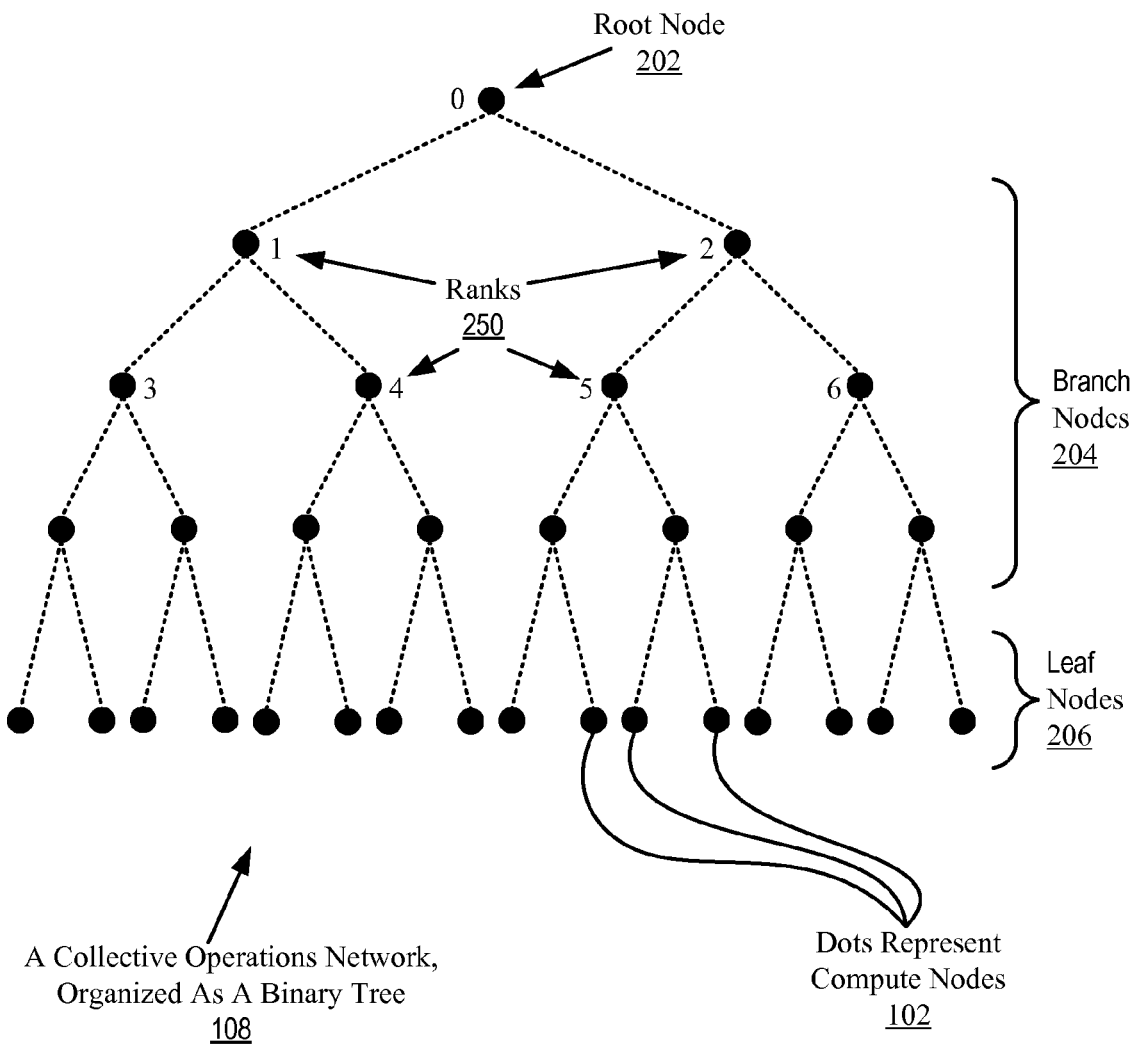
FIG. 5 illustrates an exemplary data communications network optimized for collective operations.

For further explanation, FIG. 5 illustrates an exemplary data communications network optimized for collective operations (108). The example data communications network of FIG. 5 organizes compute nodes as a tree. In the example of FIG. 5, dots represent compute nodes (102) of a parallel computer, and the dotted lines between the dots represent data communications links between compute nodes. The data communications links are implemented with collective operations data communications adapters similar to the one illustrated for example in FIG. 3B, with each node typically providing data communications to and from two child nodes and data communications to and from a parent node, with some exceptions. Nodes in a binary tree may be characterized as a root node (202), branch nodes (204), and leaf nodes (206). The root node (202) has two children but no parent. The leaf nodes (206) each has a parent, but leaf nodes have no children. The branch nodes (204) each has both a parent and two children. The links and compute nodes are thereby organized by this data communications network optimized for collective operations into a binary tree (108). For clarity of explanation, the data communications network of FIG. 5 is illustrated with only 31 compute nodes, but readers will recognize that a data communications network optimized for collective operations for use in locating hardware faults in accordance with embodiments of the present invention may contain only a few compute nodes or may contain thousands of compute nodes.

In the example of FIG. 5, each node in the tree is assigned a unit identifier referred to as a 'rank' (250). A node's rank uniquely identifies the node's location in the tree network for use in both point to point and collective operations in the tree network. The ranks in this example are assigned as integers beginning with 0 assigned to the root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

Figure 6:
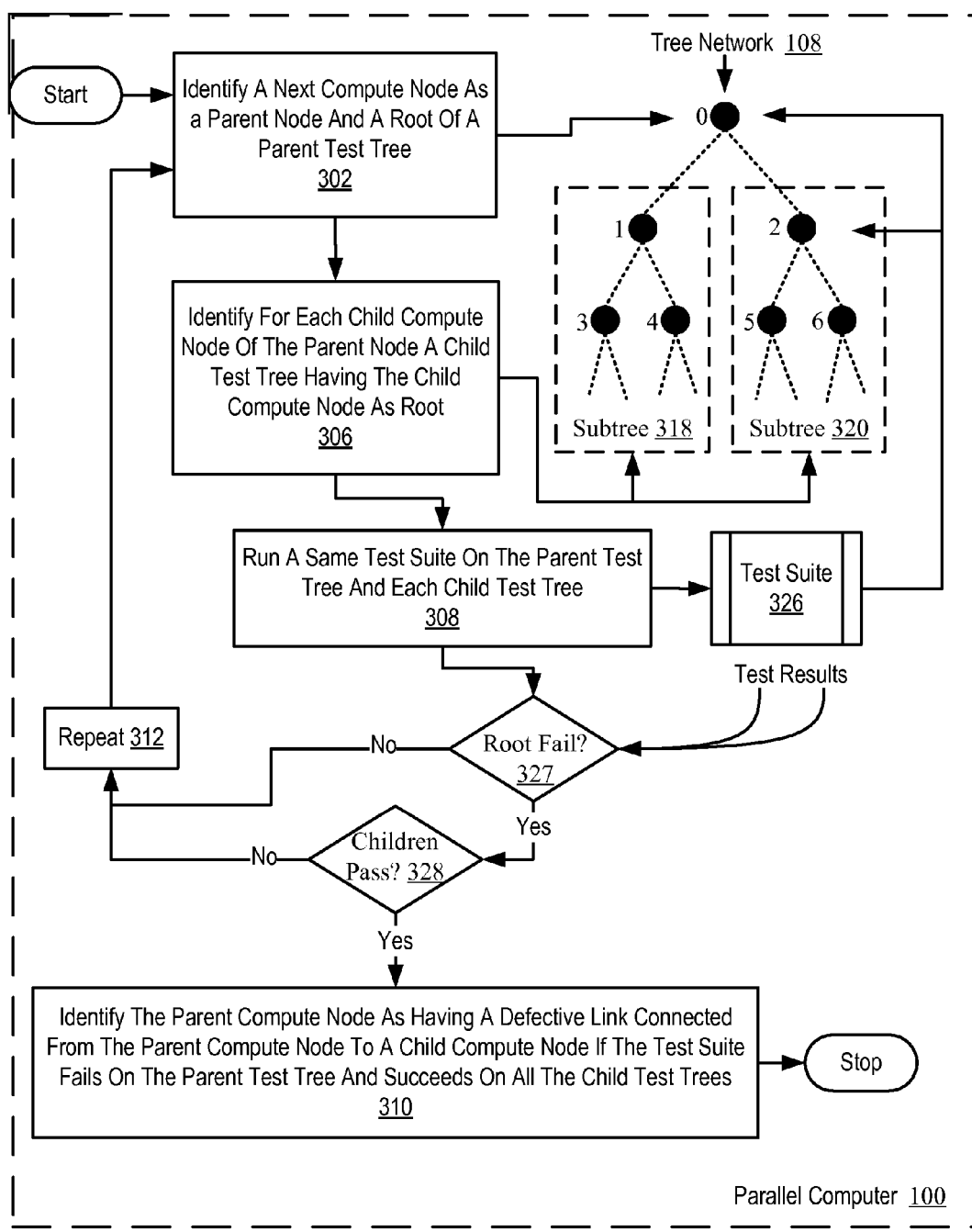
FIG. 6 sets forth a flow chart illustrating an exemplary method of locating hardware faults in a data communications network of a parallel computer according to embodiments of the present invention.

For further explanation, FIG. 6 sets forth a flow chart illustrating an exemplary method of locating hardware faults in a data communications network of a parallel computer according to embodiments of the present invention. The method of FIG. 6 is carried out in a parallel computer (100) that includes a plurality of compute nodes and a data communications network (108) that couples the compute nodes for data communications and organizes the compute node as a tree. The dots in FIG. 6 represent compute nodes, and the dotted lines between the dots represent data communications links among the compute nodes. Each compute node in FIG. 6 is illustrated with its rank, a numeric integer beginning with 0 and continuing through 6. For ease of illustration, only the ranks of the first three layers of the tree are shown here, but all compute nodes in the tree network are assigned a unique rank. For clarity of explanation, the data communications network (108) of FIG. 6 is illustrated with only 6 compute nodes, but readers will recognize that a data communications network optimized for collective operations for use in locating hardware faults in accordance with embodiments of the present invention may contain any number of compute nodes, only a few or thousands.

Readers will notice that the tree network (108) illustrated in FIG. 6 is organized with a binary radix, a so-called binary tree, the root and each branch node having two children. The binary radix is used here, however, merely for ease of explanation, not as a limitation of the invention. In data communications networks of parallel computers that organize compute nodes in trees according to embodiments of the present invention, the root node and the branch nodes in such networks may have any number of child nodes as may occur to those of skill in the art. The term 'child' as used in this specification refers to immediate children of a parent node—not to grandchildren, great-grandchildren, and the like.

The method of FIG. 6 includes identifying (302) a next compute node as a parent node and a root of a parent test tree. The method of FIG. 6 is an iterative process that in typically applications will loop. The first 'next' compute node therefore typically is the root compute node of the entire tree network, in this example, node 0. Each branch node can then be taken in turn as a next compute node to be identified as a parent node and a root of a parent test tree.

The method of FIG. 6 also includes identifying (306) for each child compute node of the parent node a child test tree (318, 320) having the child compute node as root. In this example, node 1 and node 2 are child compute nodes of which node 0 is the parent. Subtree (318) is a child test tree that has a child compute node, node 1, as its root, and Subtree (320) is a child test tree that has a child compute node, node 1, as its root.

The method of FIG. 6 also includes running (308) a same test suite (326) on the parent test tree and each child test tree. In the method of FIG. 6, the test suite (326) is composed of a number of parallel-computing collective operations that may include, for example, a broadcast operation, a scatter operation, a gather operation, an allgather operation, a reduce operation, and an allreduce operation. Alternatively, the test suite further may include all collective operations available on the parallel computer, thereby giving the entire tree network a very thorough exercise.

In the method of FIG. 6, running (308) a same test suite (326) on each child test tree may include running the test suite simultaneously on all child test trees. In a system that uses an improved MPI library as its parallel communications library, for example, each child tree of an iteration of the diagnostic method may be declared a communicator, and all operations of the test suite may executed simultaneously in parallel on each communicator.

The method of FIG. 6 includes identifying (310) the parent compute node as having a defective link connected from the parent compute node to a child compute node if the test suite fails on the parent test tree and succeeds on all the child test trees. The method of FIG. 6 also includes repeatedly (312) carrying out steps of the method in a loop for a plurality of branch compute nodes of the parallel computer. In particular in the example of FIG. 6, the method includes repeatedly (312) carrying out steps of the method for a plurality of branch compute nodes in the computer until a test suite fails for a parent compute node and succeeds for all the parent computer node's child compute nodes. The method includes determining (327) whether the root compute node of an iteration fails the test suite, and, if the root does not fail, looping (312) back through a diagnostic application by repeating the steps of identifying a next compute node as a parent, identifying a child test tree for each child of the parent, running the same test tree on the parent test tree and each child test tree, and so on.

The method of FIG. 6 also includes determining (328) whether all the children of the root compute node of an iteration pass the test suite, and, if a child fails, looping (312) back through a diagnostic application by repeating the steps of identifying a next compute node as a parent, identifying a child test tree for each child of the parent, running the same test tree on the parent test tree and each child test tree, and so on. The method of FIG. 6 therefore identifies (310) the parent compute node as having a defective link connected from the parent compute node to a child compute node only if the test suite fails on the parent test tree and succeeds on all the child test trees. The fact that the test suite fails on the parent test tree and succeeds on all the child test trees means that there is a hardware fault in a data communications link between the parent in the present iteration of the method and its children. In a binary tree, this result locates the hardware fault within only two data communications links out of what in many instances may be many thousands.

Readers will recognize that the method so described resembles a recursive scan of a tree structure. Phrased another way, the method of FIG. 6 can be described as:

Run a test suite on a 'top' tree, a global tree of compute nodes having its root at node 0.

If the top tree fails, run the suite on the two subtrees, one with node 1 as its root and one with node 2 at its root.

If both subtrees run without failure, the fault lies in one of the two data communications links between node 0 and its child nodes 1 and 2. Known hardware support techniques will quickly show which link is faulty.

If one subtree fails, then ignore the successful subtree and 'recurse' back to the first step of the method on the failing subtree.

If both subtrees fail, then 'recurse' back to the first step of the method on both subtrees.

The term 'recurse' is used only for explanation, not as a literal description. Recursion as such is not practiced here because the compute nodes in this example all run the same diagnostic application and the same test suite in parallel on separate, independent processors with no shared memory space. Nevertheless, the idea of recursion will give to readers of skill in the art an impression of the method, stepping iteratively through the tree, visiting node after node, treating each node in turn as a root of a parent test tree with child nodes each of which subtends a child test tree that is a subtree of the parent test tree.

Figure 7:
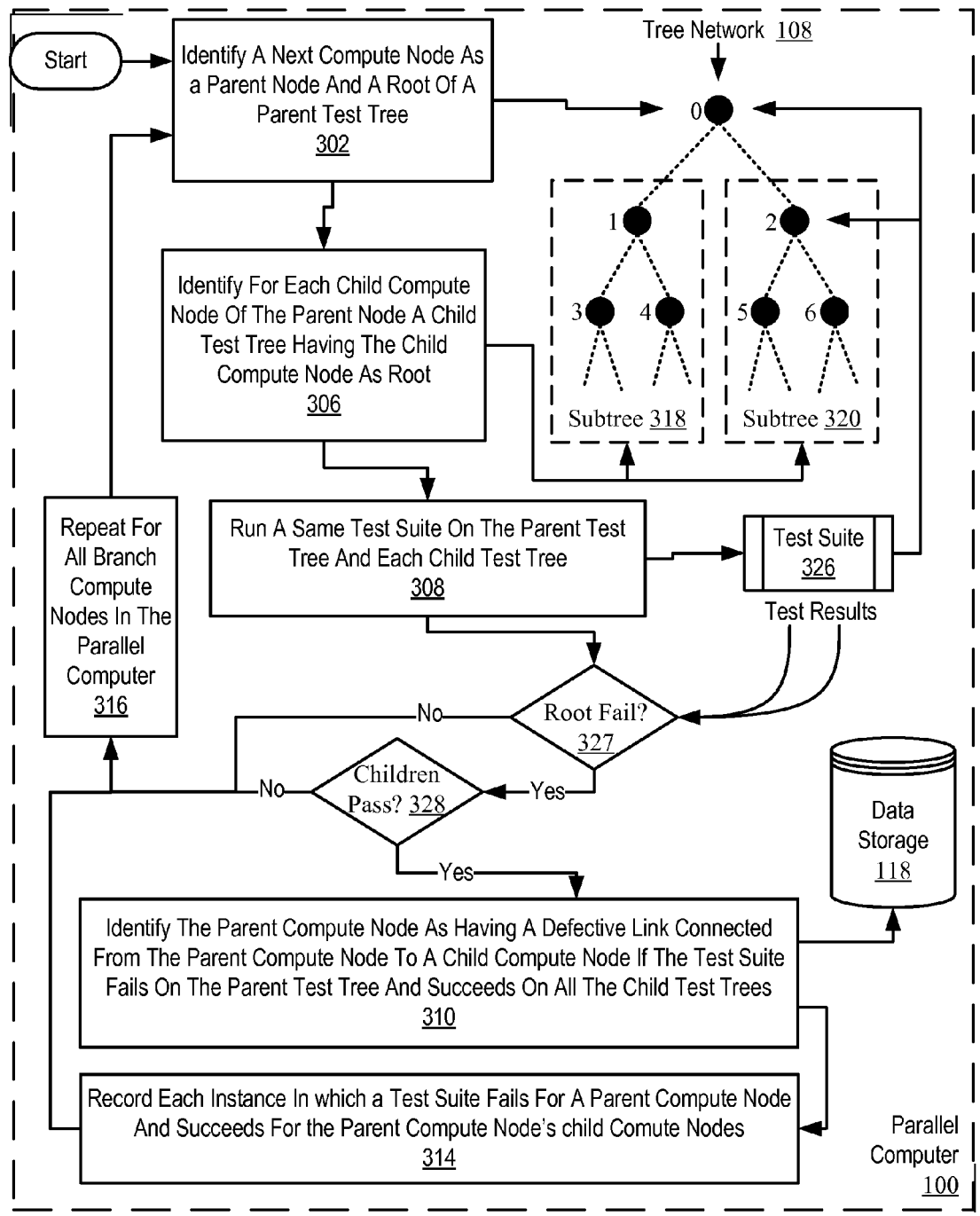
FIG. 7 sets forth a flow chart illustrating a further exemplary method of locating hardware faults in a data communications network of a parallel computer according to embodiments of the present invention.

For further explanation, FIG. 7 sets forth a flow chart illustrating a further exemplary method for of locating hardware faults in a data communications network of a parallel computer according to embodiments of the present invention. The method of FIG. 7 is similar to the method of FIG. 6. The method of FIG. 7, like the method of FIG. 6, is carried out in a parallel computer (100) that includes a plurality of compute nodes and a data communications network (108) that couples the compute nodes for data communications and organizes the compute node as a tree. The dots in FIG. 7 represent compute nodes, and the dotted lines between the dots represent data communications links among the compute nodes. Each compute node in FIG. 7 is illustrated with its rank represented as a numeric integer.

The method of FIG. 7, includes the following steps, each of which operates as described above for the method of FIG. 6: identifying (302) a next compute node as a parent node and a root of a parent test tree, identifying (306) for each child compute node of the parent node a child test tree (318, 320) having the child compute node as root, running (308) a same test suite (326) on the parent test tree and each child test tree, and identifying (310) the parent compute node as having a defective link connected from the parent compute node to a child compute node if the test suite fails on the parent test tree and succeeds on all the child test trees.

The method of FIG. 7, however, also includes repeatedly (316) carrying out the steps of the method for all branch compute nodes in the computer and recording (314) each instance in which a test suite fails for a parent compute node and succeeds for all the parent compute node's child compute nodes. That is, the method of FIG. 7, unlike the method of FIG. 6, does not cease operation upon identifying a parent compute node of an iteration with a defective link connected between the parent compute node and a child compute node. Instead, the method of FIG. 7 continues operation until all branch nodes of the data communications network have been tested. In this way, the method of FIG. 7 may locate a hardware fault that does not appear when a subtree is tested as part of a larger subtree but does appear when the subtree is tested independently.

Figure 8:
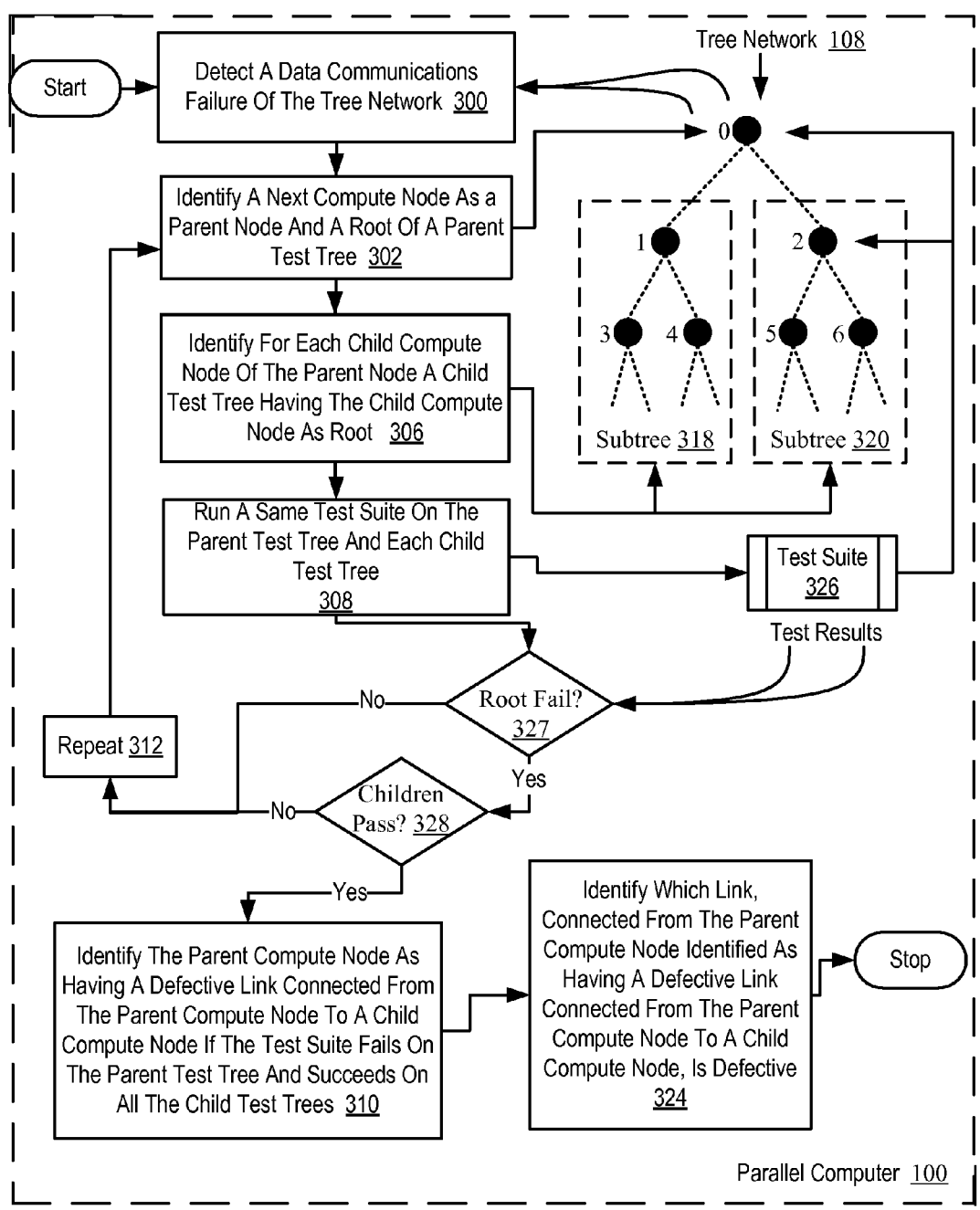
FIG. 8 sets forth a flow chart illustrating a further exemplary method of locating hardware faults in a data communications network of a parallel computer according to embodiments of the present invention.

For further explanation, FIG. 8 sets forth a flow chart illustrating a further exemplary method for of locating hardware faults in a data communications network of a parallel computer according to embodiments of the present invention. The method of FIG. 8 is similar to the method of FIG. 6. The method of FIG. 8, like the method of FIG. 6, is carried out in a parallel computer (100) that includes a plurality of compute nodes and a data communications network (108) that couples the compute nodes for data communications and organizes the compute node as a tree. The dots in FIG. 8 represent compute nodes, and the dotted lines between the dots represent data communications links among the compute nodes. Each compute node in FIG. 8 is illustrated with its rank represented as a numeric integer.

The method of FIG. 8, includes the following steps, each of which operates as described above for the method of FIG. 6: identifying (302) a next compute node as a parent node and a root of a parent test tree, identifying (306) for each child compute node of the parent node a child test tree (318, 320) having the child compute node as root, running (308) a same test suite (326) on the parent test tree and each child test tree, and identifying (310) the parent compute node as having a defective link connected from the parent compute node to a child compute node if the test suite fails on the parent test tree and succeeds on all the child test trees.

The method of FIG. 8, however, also includes the additional step of detecting (300) a data communications failure of the tree network. In this example, detecting (300) a data communications failure of the tree network is the first step in the method. That is, in this example, the method first detects a failure, and then proceeds straightaway to locate the fault that caused the failure. In this way, rather than halting the computer upon detecting a failure, a diagnostic application may also report the location of a hardware fault that caused the failure. Detecting (300) a data communications failure of the tree network may be carried out, for example, by following an MPI broadcast operation with a gather. After the gather, every element of the root compute node's receive buffer should contain an exact copy of the broadcast data. If even one does not, the method may conclude that a data communications failure has occurred.

The method of FIG. 7 also includes identifying (324) which link, connected from the parent compute node identified as having a defective link connected from the parent compute node to a child compute node, is defective. This method up to this point in processing has located a hardware fault specifically to data communications links between one compute node and its child nodes in a data communications network—links between one node and its children out of possibly thousands of nodes and links. This step of identifying (324) which link, connected from the parent compute node identified as having a defective link connected from the parent compute node to a child compute node, is defective represents locating the exact data communications link that is faulty. Identifying (324) which link, connected from the parent compute node identified as having a defective link connected from the parent compute node to a child compute node, is defective may carried out by any known tree network communications diagnostic tool, automated or manual, as will occur to those of skill in the art.

Exemplary embodiments of the present invention are described largely in the context of a fully functional computer system for locating hardware faults in a data communications network of a parallel computer. Readers of skill in the art will recognize, however, that the present invention also may be embodied in a computer program product disposed on recordable media for machine-readable information, including magnetic media, optical media, or other suitable media. Examples of recordable media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of locating hardware faults in a data communications network of a parallel computer, the parallel computer comprising a plurality of compute nodes and a data communications network that couples the compute nodes for data communications and organizes the compute node as a tree, the method comprising repeatedly carrying out the following steps for a plurality of branch compute nodes of the parallel computer:
   identifying a next compute node as a parent node and a root of a parent test tree;
   identifying for each child compute node of the parent node a child test tree having the child compute node as root;
   running a same test suite on the parent test tree and each child test tree, wherein the same test suite is composed of parallel-computing collective operations; and
   identifying the parent compute node as having a defective link connected from the parent compute node to a child compute node if the test suite fails on the parent test tree and succeeds on all the child test trees.

2. The method of claim 1 further comprising repeatedly carrying out the steps of the method for a plurality of branch compute nodes in the computer until a test suite fails for a parent compute node and succeeds for all the parent computer node's child compute nodes.

3. The method of claim 1 further comprising:
   repeatedly carrying out the steps of the method for all branch compute nodes in the computer; and
   recording each instance in which a test suite fails for a parent compute node and succeeds for all the parent compute node's child compute nodes.

4. The method of claim 1 wherein the test suite further comprises collective operations further including a broadcast operation, a scatter operation, a gather operation, an allgather operation, a reduce operation, and an allreduce operation.

5. The method of claim 1 wherein the test suite further comprises all collective operations available on the parallel computer.

6. The method of claim 1 wherein running a same test suite on each child test tree further comprises running the test suite simultaneously on all child test trees.

7. The method of claim 1 further comprising detecting a data communications failure of the tree network.

8. The method of claim 1 further comprising identifying which link, connected from the parent compute node identified as having a defective link connected from the parent compute node to a child compute node, is defective.

9. An apparatus for locating hardware faults in a data communications network of a parallel computer, the apparatus comprising the parallel computer, the parallel computer comprising a plurality of compute nodes and a data communications network that couples the compute nodes for data communications and organizes the compute node as a tree, the apparatus further comprising a computer processor, a computer memory operatively coupled to the computer processor, the computer memory having disposed within it computer program instructions which, when executed, cause the processor to carry out the steps of:

identifying a next compute node as a parent node and a root of a parent test tree;
identifying for each child compute node of the parent node a child test tree having the child compute node as root;
running a same test suite on the parent test tree and each child test tree, wherein the same test suite is composed of parallel-computing collective operations; and
identifying the parent compute node as having a defective link connected from the parent compute node to a child compute node if the test suite fails on the parent test tree and succeeds on all the child test trees.

10. The apparatus of claim 9 wherein the test suite further comprises collective operations further including a broadcast operation, a scatter operation, a gather operation, an allgather operation, a reduce operation, and an allreduce operation.

11. The apparatus of claim 9 wherein the test suite further comprises all collective operations available on the parallel computer.

12. The apparatus of claim 9 wherein running a same test suite on each child test tree further comprises running the test suite simultaneously on all child test trees.

13. A computer program product for locating hardware faults in a data communications network of a parallel computer, the parallel computer comprising a plurality of compute nodes and a data communications network that couples the compute nodes for data communications and organizes the compute node as a tree, the computer program product disposed upon a recordable medium for machine-readable information, the computer program product comprising computer program instructions which, when executed, cause the processor to carry out the steps of:

identifying a next compute node as a parent node and a root of a parent test tree;
identifying for each child compute node of the parent node a child test tree having the child compute node as root;
running a same test suite on the parent test tree and each child test tree, wherein the same test suite is composed of parallel-computing collective operations; and
identifying the parent compute node as having a defective link connected from the parent compute node to a child compute node if the test suite fails on the parent test tree and succeeds on all the child test trees.

14. The computer program product of claim 13 further comprising computer program instructions capable of repeatedly carrying out the steps of the method for a plurality of branch compute nodes in the computer until a test suite fails for a parent compute node and succeeds for all the parent computer node's child compute nodes.

15. The computer program product of claim 13 further comprising computer program instructions capable of:

repeatedly carrying out the steps of the method for all branch compute nodes in the computer; and
recording each instance in which a test suite fails for a parent compute node and succeeds for all the parent compute node's child compute nodes.

16. The computer program product of claim 13 wherein the test suite further comprises collective operations further including a broadcast operation, a scatter operation, a gather operation, an allgather operation, a reduce operation, and an allreduce operation.

17. The computer program product of claim 13 wherein the test suite further comprises all collective operations available on the parallel computer.

18. The computer program product of claim 13 wherein running a same test suite on each child test tree further comprises running the test suite simultaneously on all child test trees.

* * * * *